C. H. FULTON.
DISTILLING PROCESS FOR RECOVERING METALS FROM ORES AND METAL BEARING MATERIALS.
APPLICATION FILED APR. 21, 1917.
1,264,628.
Patented Apr. 30, 1918.
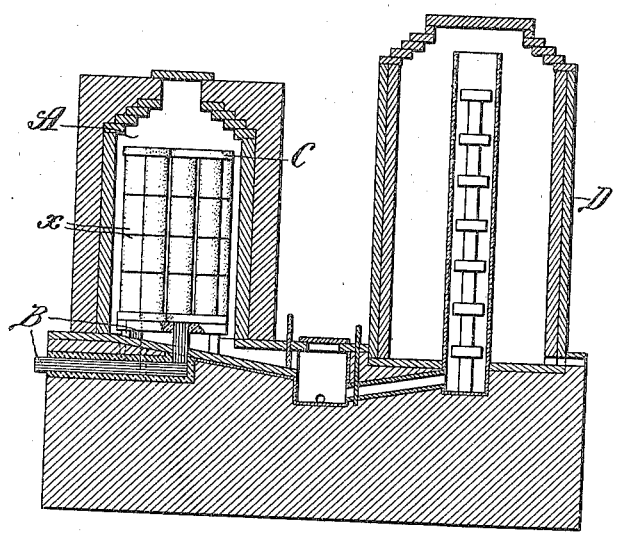
Inventor,
Charles H. Fulton.
By Bakewell Kline Attys.

UNITED STATES PATENT OFFICE.

CHARLES H. FULTON, OF ST. LOUIS, MISSOURI, ASSIGNOR, BY MESNE ASSIGNMENTS, TO METALLURGICAL LABORATORIES, INCORPORATED, OF CHICAGO, ILLINOIS, A CORPORATION OF ILLINOIS.

DISTILLING PROCESS FOR RECOVERING METALS FROM ORES AND METAL-BEARING MATERIALS.

1,264,628.  Specification of Letters Patent.  Patented Apr. 30, 1918.

Application filed April 21, 1917. Serial No. 163,597.

*To all whom it may concern:*

Be it known that I, CHARLES H. FULTON, a citizen of the United States, residing at St. Louis, Missouri, have invented a certain new and useful Improvement in Distilling Processes for Recovering Metals from Ores and Metal-Bearing Materials, of which the following is a full, clear and exact description, such as will enable others, skilled in the art to which it appertains, to make and use the same.

This invention relates to the recovery of metals from ores and metal-bearing materials.

The main object of the invention is to provide a practicable distilling process for recovering metals other than zinc from their ores and from metal-bearing materials, that can be accurately controlled and which materially reduces the cost per ton of treating metallic ores and metal-bearing materials of the character hereinafter referred to to recover the metal content of same.

Another object is to provide a briquet of novel composition for use in distilling furnaces.

My present process is applicable to the recovery of metals other than zinc which have a relatively low boiling point, for example, under 2,000° C. Therefore, I have used the term "ores or metal-bearing materials of the character described" in the claims to mean ores or materials other than zinc ore or material which contain metals that have a boiling point under 2,000° C.

Briefly described, the process consists in forming ore or metal-bearing material of the character described into objects that will retain their substantially original form and volume when heated to a distilling temperature, subjecting said objects to heat in a distilling apparatus so as to convert the metal in same into vapor, and thereafter treating the vapor so as to recover the metal from same. Any suitable type of distilling apparatus may be used and any suitable apparatus may be used for recovering the products of the distillation. I prefer, however, to use an electric distilling furnace on account of the high temperatures that can be obtained when objects of the character previously referred to and of the construction hereinafter particularly described are used to form a continuous, fixed resistor between the electrodes of an electric distilling furnace.

The distinguishing characteristic of my process consists in forming ore or metal-bearing material of the character described into objects that will retain their approximately original form and volume when they are subjected to a temperature sufficiently high to distil the metal contained in same. This is essential whether the distilling operation is carried on in a furnace heated by carbonaceous fuel or in an electric distilling furnace. It is immaterial how the objects are formed and the shape of the objects is also immaterial. I prefer, however, to form the objects by mixing finely divided ore or metal-bearing material of the character described with a binding material and with a substance that is either naturally porous or which can be made so by heat treatment, and thereafter forming said mixture into briquets of spherical, cylindrical or other preferred shape in molds, wherein they are subjected to sufficient pressure to solidify the mixture and form it into objects that will not swell or crack when they are subjected to a distilling temperature. A reducing agent or other reagent is combined with the ore or metal-bearing material during the operation of forming the briquets. The composition of the briquet depends upon the metal being treated. When the metalliferous substance is a compound containing oxygen, and is comparatively easily reducible to metal, the chemical reagent necessary is some form of carbon, such as coke. If the metalliferous substance is of such a character that carbon has no effect on same, as, for instance, mercury ore (cinnabar) the necessary chemical reagent added is either iron oxid in the form of iron ore, or metallic iron or lime. I prefer to use finely divided coke as the porous substance of the briquet, because it contains no volatile matter to be driven off during the distilling operation, because it presents a stable and unchangeable material about which the body of the briquet is formed, thus insuring the continued stability of the briquet during and after the final distilling operation, because it is a good conductor of electricity and because it serves both as the reducing agent and the porous substance in some instances. Various binding substances or materials may be used, but I prefer to use a carbonaceous binding material, preferably pitch, because after the volatile matter is distilled from it, there is left a solid coke residue which firmly binds the ore particles and coke particles into a coherent mass. The proportions of the ore or metal-bearing material and the other substances used in the composition of the briquets will vary with different ores and metal-bearing materials, but the essential thing in respect to the ore or metal-bearing material and the porous substance is that they shall be in a finely divided state and of such proportions that there will be left, after distillation, a sufficient mass of porous material to maintain the approximately original form and volume of the briquets. The essential thing about the quantity of binder is that it shall be sufficient to unite all ingredients into a coherent mass by its adhesive action when the briquets are first formed and also hold the ingredients together when the briquets are thereafter heated, either for the purpose of driving off the volatile matter in the binding material, or to distil the metal contained in the briquets. In practising my process I have found that briquets having the characteristics above referred to will be produced if the quantity of binding material used is equal to about 8% to 12% of the weight of the ore, plus the coke. Tar or coal tar pitch forms a very efficient binder, and while it is immaterial how the various ingredients are combined, I prefer either to mix ore, coke and powdered pitch and then heat the mixture, or mix ore and coke, heat the mixture and then add molten pitch, or mix ore, coke and some powdered pitch and then add some tar and work the mixture cold. Any of the above methods of mixing the ingredients produces a mixture in which the various ingredients are coated with the binder. It is necessary to heat the briquets after they have been removed from the molds, or just prior to the beginning of the actual distilling operation, so as to drive off the volatile matter in the binder and convert the binder into coke. To secure the most advantageous results the above described preheating and drying of the briquets must be done under strictly non-oxidizing conditions, for if oxygen is permitted to reach the briquets during such operation, the coke will oxidize on the surface of the briquets and cause the outside of the briquets to assume a loose and friable condition, with resulting disintegration of the surface of the briquets.

After the briquets have been formed they are subjected to heat in a distilling apparatus, so as to cause the metal in same to be driven off in the form of a vapor. Thereafter, the vapor is admitted to an apparatus wherein it is subjected to treatment, so as to recover the metal either as metallic metal, or in the form of any suitable compound, such as the oxid, etc.

The figure of the drawing illustrates an apparatus that can be used to practise my process.

If an electric distilling furnace is used, one or more briquets $x$, formed in the manner previously described, are arranged in the distilling chamber A of the furnace, so as to form a continuous, fixed resistor between the electrodes B of the furnace. Thereafter, a current of electricity is passed through the briquet or briquets to heat them to a distilling temperature. The briquets are preferably arranged to form a number of vertical columns whose lower ends rest on the electrodes B of the furnace and whose upper ends are connected together by suitable connectors C. By varying the amount of the current passed through the briquets the speed of distillation may be kept under perfect control and the rate of distillation varied at will, the current being preferably supplied to the furnace through a transformer so designed as to supply current of different voltages. If the current at any given voltage is too great or too small, the voltage of the transformer may be decreased or increased until the proper flow of current is obtained. The amount of current passed through the briquets is preferably at first relatively small, so that the walls of the distilling chamber will be heated gradually by radiation from the briquets. The current may then be rapidly increased and the briquets raised to a distilling temperature. The products of the distillation pass from the distilling chamber A of the furnace into an apparatus D, wherein it is treated so as to recover the metal in same. At the completion of the distilling operation the briquets are in their approximately original form, and consequently, they can be removed easily from the distilling chamber.

The thing that makes the above operation commercially practicable is the characteristic of the briquets of retaining their approximately original form and volume when they are subjected to a distilling temperature and the conductivity that the coke imparts to the briquets. In other words, it is commercially feasible to use briquets of the construction above described to form a continuous, fixed resistor between the electrodes of an electric distilling furnace, because the briquets contain material, namely coke, that is a good conductor of electricity, and the various ingredients in the briquets are so proportioned and combined that the briquets will not crumble or break down when they are subjected to an electric current of such strength as will cause the metal in the briquets to be distilled.

My improved electrical process is very efficient, because the heat and energy necessary to carry on the reactions are generated uniformly within the charge itself, and are not transmitted to the charge from the exterior through furnace walls, thus cutting down heat losses by radiation, etc., to a minimum. In other words, in my present process the metal to be distilled is contained in the cells of a cellular structure formed of a substance that is a conductor of electricity and constructed in such a manner that it will not break down and break the circuit during the distilling operation.

Another desirable feature of my process, when practised in an electric distilling furnace, is that it can be accurately controlled, both as to the speed of distillation and the rate of distillation, by varying the amount of current passed through the briquets.

Furthermore, my process materially reduces the labor cost per ton of recovering metals of the character described from their ores and material in which they are contained, owing to the fact that the metal is in such form that only a few operatives are required to run a distilling apparatus of great capacity. The briquets used in my process are also of novel construction, and while they are particularly adapted for use in an electric distilling furnace, they can be used successfully in any other kind of distilling apparatus.

Having thus described my invention, what I claim, and desire to secure by Letters Patent, is:

1. A process for recovering metal, characterized by forming ore or metal-bearing material of the character described into objects that will retain their approximately original form and volume when subjected to a distilling temperature, arranging one or more of said objects in a chamber, and subjecting said object or objects to heat of a sufficiently high temperature to distil the metal contained in same.

2. A process for recovering metal, characterized by forming ore or metal-bearing material of the character described into objects that will retain their approximately original form and volume when subjected to a distilling temperature, arranging one or more of said objects in a chamber, heating said object or objects so as to vaporize the metal contained in same, and thereafter treating the products of the distillation so as to recover the metal in same.

3. A process for recovering metal, characterized by mixing finely divided ore or metal-bearing material of the character described with a finely divided, porous substance and forming said mixture into objects that will retain their approximately original form and volume when subjected to a distilling temperature, and thereafter arranging one or more of said objects in a chamber and subjecting said object or objects to heat so as to distil the metal contained in same.

4. A process for recovering metal, characterized by forming briquets from finely divided ore or metal-bearing material of the character described, a finely divided, porous substance and a binding material mixed in such proportions that the briquets will retain their approximately original form and volume when subjected to a distilling temperature, and thereafter distilling the metal from said briquets.

5. A process for recovering metal, characterized by forming briquets from finely divided ore or metal-bearing material of the character described, finely divided coke and a carbonaceous binding material mixed in such proportions that the briquets will retain their approximately original form and volume when subjected to a distilling temperature, subjecting the briquets to heat so as to distil the metal contained in same, and thereafter treating the products of the distillation to recover the metal.

6. A process for recovering metal, characterized by forming briquets from finely divided ore or metal-bearing material of the character described, finely divided coke and a carbonaceous binding material mixed in such proportions that the briquets will retain their approximately original form and volume when subjected to a distilling temperature, heating the briquets so as to drive off the volatile matter in the binder, thereafter subjecting the briquets to a distilling operation, and finally treating the products of the distillation so as to recover the metal in the form desired.

7. A process for recovering metal, characterized by forming ore or metal-bearing material of the character described into electrical conducting objects that will retain their approximately original form and volume when subjected to a distilling temperature, arranging one or more of said objects in a distilling chamber, and thereafter passing a current of electricity through said object or objects so as to heat them to a sufficiently high temperature to cause the metal to be distilled from same.

8. A process for recovering metal, characterized by forming briquets from finely divided ore or metal-bearing material of the character described and an electrical conducting substance mixed in such proportions that the briquets will retain their approximately original form and volume when subjected to a distilling temperature, arranging one or more of said briquets in a closed chamber, passing a current of electricity through same so as to heat them to a distilling temperature, and thereafter recovering the products of the distillation.

9. A process for recovering metal, characterized by forming briquets from finely divided ore or metal-bearing material of the character described, a finely divided, porous substance, a binding material and a suitable reagent mixed in such proportions that the briquets will retain their approximately original form and volume when subjected to a distilling temperature, thereafter distilling the metal from said briquets, and finally treating the products of the distillation to recover the metal.

10. A process for recovering metal, characterized by forming briquets from finely divided ore or metal-bearing material of the character described, finely divided coke, a carbonaceous binding material and a suitable reagent mixed in such proportions that the briquets will retain their approximately original form and volume when subjected to a distilling temperature, heating said briquets in a distilling chamber so as to vaporize the metal contained in same, and thereafter treating the metal vapor to recover the metal.

11. An article for use in distilling furnaces, consisting of ore or metal-bearing material of the character described and a porous substance formed into a compact mass that will retain its approximately original form and volume when subjected to a distilling temperature.

12. An article for use in distilling furnaces, consisting of finely divided ore or metal-bearing material of the character described, a porous substance and a binding material combined into a compact mass that will retain its approximately original form and volume when subjected to a distilling temperature.

13. An article for use in distilling furnaces, consisting of finely divided ore or metal-bearing material of the character described and an electrical conductor combined into a compact mass that will retain its approximately original form and volume when subjected to a distilling temperature.

14. An article for use in distilling furnaces, consisting of a molded object formed from finely divided ore or metal-bearing material of the character described, finely divided coke and a carbonaceous binder mixed in such proportions that said object will retain its approximately original form and volume when subjected to a distilling temperature.

15. An article for use in distilling furnaces composed of a coke matrix filled with finely divided ore or metal-bearing material of the character described, said coke matrix being so constructed that it will retain its approximately original form and volume when subjected to a distilling temperature.

16. An article for use in distilling furnaces composed of a coke matrix filled with finely divided ore or metal-bearing material of the character described mixed with a reagent that will bring about the necessary reaction when said article is subjected to a distilling temperature.

17. An article for use in distilling furnaces, consisting of a cellular structure formed from a substance that is a conductor of electricity, and finely divided ore or metal-bearing material of the character described that fills the cells of said structure.

18. An article for use in distilling furnaces, consisting of ore or metal-bearing material of the character described, a porous substance, a binding material and a suitable reagent combined into a compact mass that will retain its approximately original form and volume when subjected to a distilling temperature.

19. A briquet for use in distilling furnaces, consisting of a molded object formed from finely divided ore or metal-bearing material of the character described, finely divided coke, a carbonaceous binding material and a suitable reagent mixed in such proportions that the object will retain its approximately original form and volume when it is subjected to a distilling temperature.

CHARLES H. FULTON.